Sept. 3, 1957  E. J. DILLMAN  2,805,025
HEATING AND COOLING CONTROL VALVE
Filed Sept. 3, 1953
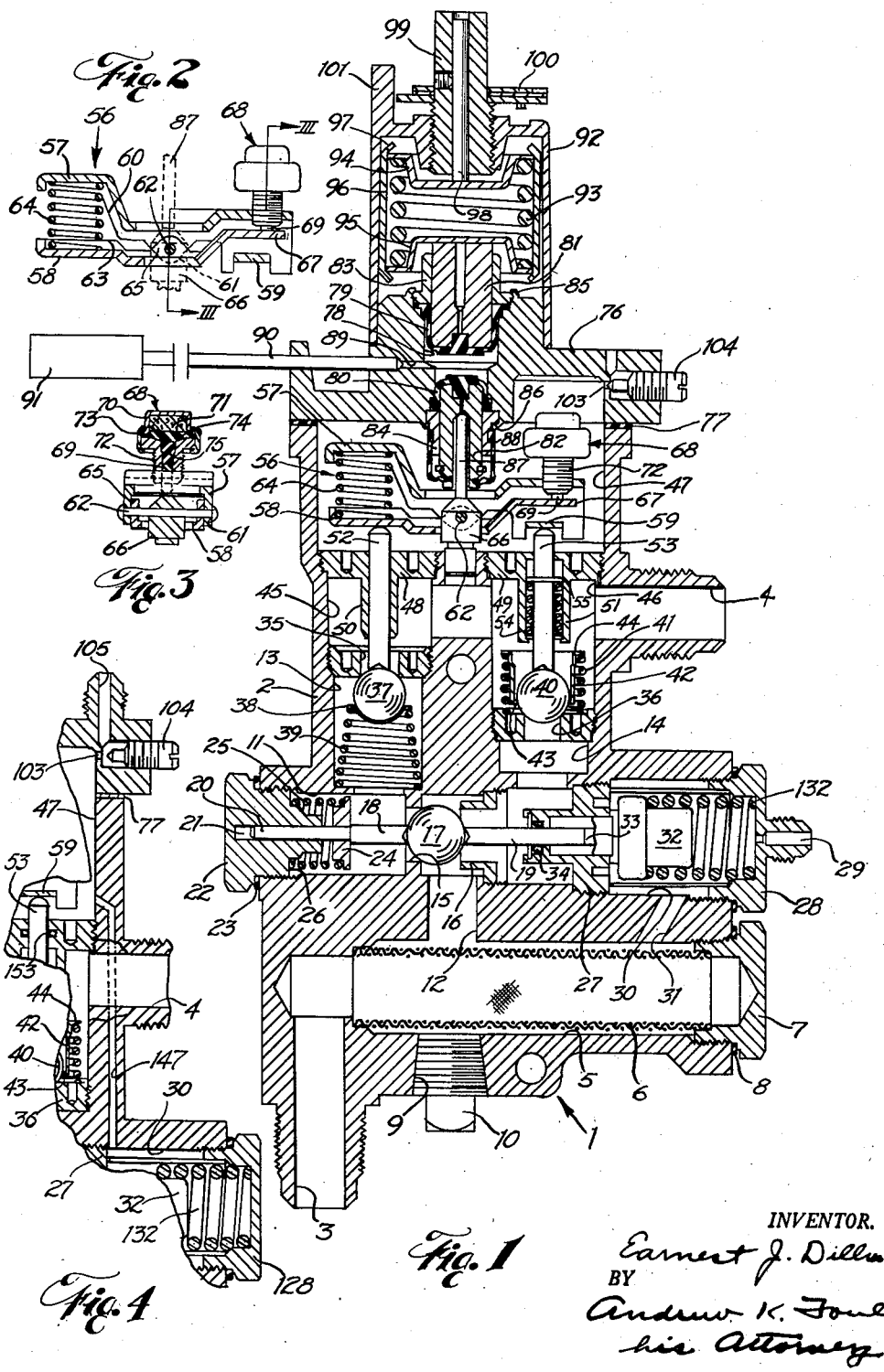
INVENTOR.
Earnest J. Dillman
BY
Andrew K. Fowlds
his Attorney

United States Patent Office 2,805,025
Patented Sept. 3, 1957

2,805,025

HEATING AND COOLING CONTROL VALVE

Earnest J. Dillman, Detroit, Mich., assignor to Detroit Controls Corporation, Detroit, Mich., a corporation of Michigan Application September 3, 1953, Serial No. 378,219

11 Claims. (Cl. 236—1)

This invention relates to new and useful improvements in control valves and more particularly to a thermostatically operated valve for controlling flow of a heating or cooling fluid to a heat exchanger.

In recent years there has come into extensive use a combined heating and cooling system in which there is provided a single heat exchanger for heating or cooling a space and which is supplied with a heating fluid for space heating during the winter and with a cooling fluid for space cooling during the summer. The use of this type of system has resulted in a demand for a control valve for modulating the flow of a heating or cooling fluid according to the temperature requirements of the space to be heated or cooled.

It is therefore one object of this invention to provide a new and improved control valve which is thermostatically modulated to control the flow of a heating or cooling fluid to a heat exchanger.

Another object of this invention is to provide a new and improved thermostatically operated control valve which has separate valves for controlling a heating or cooling fluid and which has a thermostatic means responsive to the temperature of the heat exchange fluid to determine which of the valves the fluid shall flow past.

Another object is to provide a thermostatically operated valve having separate flow passages for heating and cooling fluids provided with separate control valves for regulating flow through said passages in accord with increase or decrease in temperature, and a thermostatically operated valve for selecting one of said passages for flow of fluid according to the temperature of said fluid.

Another object is to provide a new and improved thermostatically operated valve having a thermostatically operated thrust transmitting linkage arranged to compensate for the effect of fluid temperature or pressure upon the thermostatic power element of the valve.

Another object is to provide a thrust transmitting linkage for a thermostatic actuator which has a thermostatic means for varying the operating relation between the actuator and the actuated means to compensate for the effect of temperature variations on said actuator.

Other objects will become apparent from time to time throughout the specification and claims as hereinafter related.

This invention comprises the new and improved construction and combination of parts which will be described more fully hereinafter, and the novelty of which will be particularly pointed out and distinctly claimed.

In the accompanying drawings to be taken as part of the specification, there is clearly and fully illustrated a preferred embodiment of this invention in which drawings:

Fig. 1 is a view in longitudinal cross section of a control valve embodying this invention, Fig. 2 is a detail sectional view of the compensator mechanism for the valve shown in Fig. 1, Fig. 3 is a detail sectional view taken on the line 3—3 of Fig. 2 and showing the connection of the compensator mechanism to the power element thrust member, and Fig. 4 is a fragmentary sectional view of the casing of a modified form of this valve in which there is provided a bypass passageway for passing the heat exchange fluid over the compensator mechanism.

Referring to the drawing by characters of reference and more particularly to Fig. 1 there is shown a flow controlling valve generally designated 1 and comprising a hollow valve casing 2 having a fluid inlet 3 and a fluid outlet 4. The valve casing 2 is provided with a transversely extending bore 5 which provides a chamber intersecting the fluid inlet 3 and in which there is positioned a strainer 6. The strainer 6 is held in position by a closure cap member 7 which is threadedly secured in the bore 5 and sealed against leakage by suitable packing 8. The bore 5 is also provided with a drain opening 9 and threaded plug 10 therefor. The valve casing 2 is provided with a second transversely extending bore 11 which is intersected by a central passageway 12 extending from the strainer chamber 5 and a pair of longitudinally extending passageways 13 and 14 which open into the valve casing outlet 4.

The valve casing bore 11 is provided with a valve seat or valve port 15 between the passageways 12 and 13 and a threaded valve seat insert member forming a valve port 16 positioned between the passageways 12 and 14. A spherical valve member 17 is positioned in the bore 11 between the valve seats 15 and 16 and is movable to control flow through the valve ports defined by said valve seats. The valve member 17 is supported between opposed thrust rods 18 and 19. The thrust rod 18 has an end portion 20 of reduced diameter extending into and guided in a cylindrical recess 21 in a closure member 22 which closes one end of the bore 11. The closure member 22 is provided with suitable packing 23 to seal the valve casing against leakage. The thrust rod 18 has a collar member 24 secured thereon which supports one end of a spring 25, the other end of which is seated against the inner wall surface 26 of the closure member 22. The other thrust rod 19 extends into and is guided in a closure member 27 which is threadedly secured adjacent the other end of the bore 11. The bore 11 is also provided with a closure member 28 having a bypass outlet opening 29 therein. The closure members 28 and 27 define a bypass chamber 30 at said other end of the bore 11. The bypass chamber 30 is connected to the strainer chamber 5 by a passageway 31. A thermostatic power element 32 is positioned in the bypass chamber 30 and supported on the closure member 27 and held thereagainst by a spring 132. The power element 32 is preferably an expansive power element of the type known as a "Vernatherm" which operates on change of state of an organic compound such as a wax or mixture of waxes. The power element 32 has a thrust member 33 which engages and moves the valve member thrust rod 19 upon change in power element temperature. The closure member 27 is provided with suitable packing 34 to prevent leakage around the thrust rod 19.

The passageways 13 and 14 are provided with valve seat members having valve ports 35 and 36 in the form of insert members threadedly secured in said passageways. The passageway 13 is provided with a spherical valve member 37 positioned on the inlet side of the valve seat member 35. The valve member 37 has a dished spring retaining member 38 positioned thereagainst and urged by a spring 39 toward an initially closed position. The valve seat 36 has a valve member 40 positioned thereagainst which is urged by a spring 41 toward open position. The valve member 40 is provided with a spring retaining member 42 having an inturned flange 43 at its lower end engaging the valve member 40 and an outturned flange 44 at its upper end receiving one end of the spring 41. The passageways 13 and 14 have portions 45 and 46 which extend past the valve seats 35 and 36 and which open into a chamber 47 at the upper end of the valve casing 2. The passageway extensions 45 and 46 are provided with threaded members 48 and 49 having guide sleeves 50 and 51, respectively. The valve members 37 and 40 are provided with a pair of thrust rods 52 and 53 which are guided in the members 48 and 49 and the guide sleeves 50 and 51. The guide sleeve 51 has an enlarged opening therein in which there is positioned a spring 54 which is engageable with a collar 55 on the thrust rod 53 and urging the thrust rod away from the valve member 40.

The upper end of the thrust rods 52 and 53 extend into the chamber 47 and engage opposite ends of a compound lever member 56. The lever member 56 comprises two separate levers 57 and 58 which are shown in more detail in Figs. 2 and 3. The lever 57 has an inturned ear or abutment portion 59 at one end engaging the thrust rod 53. The lever 57 has downturned side flange portions 60 having an ear portion 61 through which there extends a pivot pin 62. The lever 58 has an upturned flange 63 which receives and positions one end of a spring 64, the other end of which is received by the end of the lever 57 opposite the abutment 59. The spring receiving end of the lever 58 engages the thrust rod 52 for the valve member 37. The lever 58 has an upturned ear portion 65 projecting from the flange 63 which receives the pivot pin 62. The levers 57 and 58 are pivotally connected to each other and to a thrust rod 66 for the power element which actuates the valve. The lever 58 has an offset end portion 67 which extends between the upper portion of the lever 57 and the inturned ear 59. The lever 57 has threadedly secured at one end a power element generally designated 68 having a movable thrust member 69 abutting the end portion 67 of the lever 58. The power element 68 is preferably one of the "Vernatherm" type (the same type as power element 32) which utilizes the expansive force of an organic material upon change of state of the same. In Fig. 3 there is shown a sectional view of this type of power element. The power element 68 has a cup-shaped casing 70 which encloses a thermostatic material 71. The casing is provided with a guide sleeve member 72 which threadedly supports the power element on the lever 57. The casing 70 and guide sleeve member 72 are secured together by an annular securing ring 73 which fits against flanged portions on the casing 70 and the sleeve member 72. The power element is provided with a rubber diaphragm 74 and a rubber thrust plug 75 for transmitting movement to the thrust member 69.

The valve casing 2 has a removable upper portion 76 which carries the thermostatic power element for operating the valve. The upper casing portion 76 is secured to the valve casing 2 by any suitable means and is packed against leakage by any suitable packing gasket 77. The casing portion 76 is provided with a bleed outlet port 103 which is normally closed by a threaded valve member 104. The upper casing portion 76 has a bore 78 extending therethrough, the upper end of which is slightly enlarged relative to the lower end. The casing bore 78 is closed at its upper end by a cup-shaped diaphragm 79 and at its lower end by a smaller cup-shaped diaphragm 80. The diaphragms 79 and 80 have movable piston members 81 and 82, respectively, therein. The piston members 81 and 82 are reciprocally guided in sleeve members 83 and 84 which are secured in place by inturned flange portions 85 and 86 on the casing portion 76. The sleeve members 83 and 84 abut and secure in position the flanged end portions of the cup-shaped diaphragms 79 and 80, respectively. The lower piston member 82 has a central recess which receives the upper end portion 87 of the thrust member 66. The guide sleeve 84 and piston member 82 have a rubber sealing sleeve member 88 secured to each to prevent leakage of fluid around the piston member 82. The upper casing portion 76 is provided with passageway 89 opening laterally into the bore 78 and in which there is secured one end of a capillary tube 90, the other end of which is secured to a remote bulb element 91. The bulb element 91, capillary tube 90, and the portion of the bore 78 between the diaphragms 79 and 80 are charged with a suitable thermal expansive liquid. The upper casing portion 76 is provided with a hollow cylindrical cap member 92 which houses an adjusting mechanism for the valve. Within the cap member 92 there is provided a helical spring 93 which abuts at its opposite ends a pair of dished spring receiving members 94 and 95. The members 94 and 95 and spring 93 are positioned within a cylindrical supporting member 96 which has inturned end tabs 97 which limit movement of the spring supporting members 94 and 95. The adjusting mechanism is positioned with the lower spring supporting member 95 abutting the upper end of the power element piston 81. The upper spring supporting member 94 abuts a rod member 98 which is carried by a threaded adjustment member 99. The adjustment member 99 has a suitable indicator disk 100 thereon which cooperates with an extension 101 on the cap member 92 to register the degree of rotation of the adjustment member 99 and therefore the temperature setting of the valve.

Operation

In operation this control valve functions generally as follows:

This valve is constructed for connection in a heating and cooling system with its inlet 3 connected to a source of heating or cooling liquid, and its outlet 4 connected to a heat exchanger for heating or cooling a room. The remote bulb element 91 would be positioned in the room being heated or cooled to modulate the valve in accord with the heating or cooling requirements of the room. If the room requires heating the valve should provide an increased flow of heating fluid upon decrease in room temperature. Similarly, if the room requires cooling, the valve should provide an increased flow of cooling fluid upon increase in room temperature. The heat exchange fluid enters the valve through the inlet 3 and a portion of it passes through the bypass passageway 31 and over the power element 32 and out through the bypass outlet 29. This bypass flow of fluid insures an accurate response by the power element 32 to the presence of a heating or cooling fluid. If a heating fluid is passing through the valve, the power element 32 will expand and move the valve member 17 to closed position against the valve seat 15 and opening the valve port through the valve seat 16 for flow of fluid. Any further expansion of the power element 32 beyond that required to close the valve member 17 against the valve seat 15 will cause the power element 32 to move away from the supporting closure member 27 against the spring member 132. A heating fluid therefore will pass from the valve inlet 3 through the strainer chamber 5, the passageway 12, the valve port through the valve seat member 16 and the passageway 14 until it reaches the valve member 40. The valve member 40 is normally urged toward an open position by the spring 41. However, when the bulb element 91 is at the predetermined temperature setting for the valve, the lower power element piston 82 will have moved sufficiently downward to move the lever member 56 and the thrust rod 53 to hold the valve member 40 in closed position against the valve seat 36. Upon decrease in temperature of the space being heated, the thermal responsive fluid in the bulb element 91 will contract and allow the diaphragm member 80, piston member 82, lever member 56, and thrust rod 53 to move upward, thus moving the valve member 40 to an open position. During opening movement of the valve member 40, the lever member 56 pivots around the thrust rod 52 for the valve member 37. When the room temperature increases as a result of the flow of heating fluid to the heat exchanger, the increase in temperature causes the fluid in the bulb element 91 to expand and move the diaphragm 80, piston member 82, and lever member 56 downward, thus moving the valve member 40 toward closed position. It should be noted that the force of the spring 39 is sufficient to permit the lever member 56 to pivot on the thrust rod 52 during closing movement of the valve member 40 without opening the valve member 37. When the room temperature reaches the predetermined setting for the valve, the valve member 40 will be completely closed as was previously described. If the room temperature should increase above the temperature setting for the valve, the further movement by the power element piston 82 would result in the lever member 56 pivoting on the thrust rod 53 and thus moving the rod 52 and valve member 37 toward open position. It should be noted however that during such a condition of operation there would be no flow of fluid past the open valve member 37, since the lower end of the passageway 13 is closed by the engagement of the valve member 17 with the valve seat 15.

When the system is changed to supply a cooling fluid to the heat exchanger, the flow of said cooling fluid past the power element 32 will result in the power element contracting and allowing the spring 25 to move the valve member 17 to closed position against the valve seat 16. In this condition of operation the flow of cooling fluid is directed through the open valve port in the valve seat 15 and passageway 13 until it reaches the valve member 37. If the bulb element 91 has responded to an increase of temperature above the predetermined temperature setting for the valve, the expansion of the power element fluid will cause the diaphragm 80 to move the piston member 82 downward. The downward movement of the piston member 82 will cause the lever member 56 to pivot on the thrust rod 53 for the closed valve member 40 and to move the thrust rod 52 downward to move the valve member 37 toward open position. A decrease in temperature in the room will result in the aforementioned pivotal movement taking place in the reverse direction and cutting off flow of cooling fluid when the room is sufficiently cooled. It should be noted therefore that during heating operation, the lever member 56 pivots about the thrust rod 52 for the closed cooling valve 37 and controls movement of the heating valve 40. Similarly, during cooling operation, the lever member 56 pivots on the thrust rod 53 for the closed heating valve 40 and modulates the position of the cooling valve 37.

The temperature of response, that is the temperature at which both valve members 37 and 40 are closed, is determined by the setting of the adjustment member 99. The adjustment of the member 99 will cause the cylinder 96, spring retaining members 94 and 95, and the spring 93 to be moved as a unit. This movement by the adjustment member will cause the upper piston member 81 to be moved and will move the upper diaphragm 79 relative to the lower diaphragm 80 and will therefore vary the volume of the space which encloses the responsive fluid for thermostatic operation of the valve. A movement of the adjustment member 99 which increases the volume of the space enclosing the thermostatic fluid results in an increase in the temperature of response at which both valve members are closed. Similarly, movement of the adjustment member 99 in a direction which decreases the volume of the power element space will result in a lower temperature of response at which both valve members will be closed. In the event of an excessive expansion of the thermostatic fluid in the power element the upper piston 81 can move upward and move the plate 95 to compress the spring 93. This movement will prevent damage to the power element or the valve members by providing a safety relief for excessive temperature response.

The valve arrangement which has been just described would function substantially the same if the compound lever member 56 were a simple lever bearing on the thrust rods 52 and 53. However, if such a construction were used, the valves would be subject to a distorted operation due to conduction of heat between the fluid passing through the valve casing and the thermostatic fluid in the power element bore 78. If a heating fluid were passing through the valve the conduction of heat to the power element bore would result in a slight heating of the thermostatic fluid therein which would tend to move the heating valve 40 slightly toward closed position. Similarly, if a cooling fluid were passing through the valve casing, it would tend to cool the thermostatic fluid by conduction through the valve casing and would tend to close the cooling valve 37 slightly due to such conduction. Changes in pressure of the heat transfer fluid can also cause similar distortions. Because of this temperature distortion, it was necessary to provide a compensating mechanism between the thermostatic power element and the valve members. This compensating mechanism comprises the levers 57 and 58, the spring 64, and the power element 68. With this lever arrangement an increase in temperature due to conduction from a heating fluid that would tend to close the valve member 40 would also result in the expansion of the power element 68. The expansion of the power element 68 would cause the lever 57 to rotate slightly in a counter-clockwise direction relative to the lever 58. This counter-clockwise rotation of the lever 57 by the power element 68 would cause the point of contact with the heating valve thrust rod 53 to be shifted slightly in a valve opening direction. The length of the levers 57 and 58 and the thermal constant of the power element 68 are set at predetermined values to provide the required compensation for the temperature distortion caused by conduction of heat to or from the heat transfer fluid passing through the valve casing. Similarly, when a cooling fluid is passing through the valve casing, the power element 68 will contract and allow the spring 64 to move the lever 58 in a counter-clockwise direction relative to the lever 57 and thus cause the point of contact with the cooling valve thrust rod 52 to be shifted in a valve opening direction by an amount substantially equal to the amount of temperature distortion caused by conduction of heat between the heat transfer fluid and the thermostatic fluid.

This compensating leverage mechanism provides an additional compensation for the difference in force exerted by the springs 39 and 41. As was previously pointed out the spring 39 is substantially stronger than the spring 41 due to the fact that the leverage mechanism pivots on the thrust rod 52 during heating operation and this thrust rod is supported only by the spring 39. The difference in forces exerted by the springs 39 and 41 produces a different temperature setting for the valve according to which spring the power element is working against. If the valve is in the intermediate position shown in Fig. 1 and the heating valve 40 has just closed the temperature of the bulb element 91 would be the temperature indicated by the adjusting dial 100. If the compound lever 56 were a simple lever the temperature of the bulb element would have to rise several degrees to develop enough thrust to open the cooling valve 37 against the force of the heavier spring 39. However, the compound lever is constructed with its proportions and the thermal characteristics of the power element 68 set to provide a slight over-compensation in response to fluid temperature in the valve casing. This over-compensation by the thermal power element 68 will shift the point of contact of the lever 58 with the thrust rod 52 in a counter-clockwise direction so that the valve 37 will just begin to open at the temperature of the bulb element 91 at which valve 40 was closed.

Similarly, when the valve is operated on a heating cycle the power element 68 will expand and will provide an over-compensation (i. e. more than is required to compensate for the effect of fluid temperature on the power element) which will compensate for the weaker spring force against the heating valve 40.

The compensating leverage mechanism which has been just described would be susceptible of having other uses than in this particular valve. This thrust transmitting mechanism obviously could be used in any device where a lever is used to transmit force from a thermostatic power element and where a compensating mechanism is desired which would compensate for temperature distortion of the type previously described.

In Fig. 4 there is shown a slight modification of this valve in which the valve casing is provided with a bypass passageway for flow of fluid over the compensator mechanism. In Fig. 4 all parts which have the same reference numbers as in the other figures have identical functions. In this form of the invention the closure cap 28 for the bypass chamber 30 is replaced with a cap 128 which does not have the bypass outlet. The valve casing wall is slightly thickened and is provided with a passageway 147 interconnecting the chambers 30 and 47. The thrust rods 52 and 53 are packed against leakage by an O ring 153 to seal the chamber 47 from the outlet passageway 4. The bleed port 103 (which in Fig. 1 is normally an air bleed) is provided with a bypass outlet 105 and the valve member 104 is normally open.

The operation of this modified form of valve is identical with the form shown and described in Fig. 1 except that the passageway 147 and bypass outlet 105 provide a continuous circulation of heat exchange fluid through both of the chambers 30 and 47. This circulation of fluid insures a quicker and more accurate response by the power elements 32 and 68 to the temperature of the heat exchange fluid.

Having thus described the invention what is claimed and desired to be secured by Letters Patent of the United States is:

1. In a control valve, a casing having a fluid inlet and a fluid outlet, a pair of passageways in said casing interconnecting said inlet and outlet, valve seats in the inlet ends of said passageways, laterally spaced outlet valve seats in the outlet ends of said passageways, a valve member positioned for movement between the valve seats at said passageway inlet ends to direct flow through one or the other of said passageways, a thermostatic power element positioned for response to temperature of a fluid passing through said valve and operable to move said valve member to direct a cooling fluid through one of said passageways and a heating fluid through the other passageway, a pair of laterally positioned outlet valve members cooperable with the valve seats at the outlet ends of said passageways, one of said outlet valve members being positioned on the inlet side of its seat, a pair of springs cooperable one with each of said last named valve members, one of said springs exerting a greater force than the other of said springs and urging said one valve member toward closed position, said other spring urging said other valve member toward open position, thermostatic means including a pivotal thrust transmitting means operatively engageable with said last named valve members and operable upon movement in one direction to seat said other valve member first and then open said one valve member and upon movement in the other direction to seat said one valve member first and then open said other valve member, and said thermostatic means including remote responsive means operable to move said thrust transmitting means in said one direction or the other upon increase or decrease of the temperature of response.

2. In a control valve, a casing having a fluid inlet and a fluid outlet, a pair of passageways in said casing interconnecting said inlet and outlet, valve seats in the inlet and outlet ends of said passageways, a valve member positioned for movement between the valve seats at said passageway inlet ends to direct flow through one or the other of said passageways, a thermostatic power element positioned for response to temperature of a fluid passing through said valve and operable to move said valve member to direct a cooling fluid through one of said passageways and heating fluid through the other passageway, a pair of valve members cooperable with the valve seats at the outlet ends of said passageways, a pair of springs cooperable one with each of said last named valve members and urging one valve member toward closed position and the other valve member toward open position, thermostatic means including a pivotal thrust transmitting means operatively engageable with said last named valve members and operable upon movement in one direction to close said other valve member first and then open said one valve member and upon movement in the other direction to close said one valve member first and then open said other valve member, said thermostatic means including remote responsive means operable to move said thrust transmitting means in said one direction or the other upon increase or decrease of the temperature of response, means associated with said thrust transmitting means to vary the operative relation of said thermostatic means and said last named valve members to compensate for the effect of a condition of the fluid in said casing on said thermostatic means.

3. A valve as defined in claim 1 wherein said thrust transmitting means comprises a pair of thrust rods reciprocally guided in said casing and engaging said last-named valve members and a lever member pivotally engaging said thrust rods at its ends; reciprocal means supporting the fulcrum for said lever member; said thermostatic means comprising a power element operatively engaging and operable to move said reciprocal means; and said lever member being operable upon movement of said reciprocal means in one direction to move said other valve member to closed position and thereafter to pivot on the thrust rod therefor to move said one valve member toward open position, and upon movement of said reciprocal means in the other direction to permit said one valve member to move to closed position and thereafter to pivot about the thrust rod therefor to permit said other valve member to move toward open position.

4. A valve as defined in claim 1 having temperature responsive means associated with said thrust transmitting means to vary the operative relation of said thermostatic means and said last named valve members to compensate for the effect of temperature of fluid passing through said casing on said thermostatic means.

5. A valve as defined in claim 3 in which said lever member comprises two levers having a single pivotal connection to each other and to said power element, one lever having one end engaging one of said thrust rods, the other lever having its other end engaging the other of said thrust rods, and a thermostatic power element carried by one of said levers and cooperable with the other lever to move the same to adjust the operating relation with said thrust rods to compensate for the effect of temperature of fluid in said casing on said first-named power element.

6. In a control valve, a casing having a fluid inlet and a fluid outlet, a pair of passageways extending longitudinally of said casing and interconecting said inlet and outlet, a pair of valve seats in the inlet end of said passageways providing a pair of spaced aligned valve ports, a valve member positioned for movement between said valve ports, a thermostatic power element positioned in the inlet end of said casing for response to fluid temperature and cooperable with said valve member to move the same to close one or the other of said valve ports in response to the presence of a heating or a cooling fluid in said casing, a pair of valve seats in the outlet end of said passageways providing laterally spaced valve ports, a pair of valve members closing said last named valve ports, a pair of springs cooperable one with each of said last named valve members and urging one valve member to closed position and the other valve member to open position, a pair of thrust rods guided in said casing and operatively engaging said last named valve members, said one valve member controlling the passageway which is opened by said power element in response to a cooling fluid, said other valve member controlling the passageway which is opened by said power element in response to a heating fluid, a lever member pivotally engaging said thrust rods at its ends, a fluid expansive power element having a remote responsive bulb element and having a movable thrust element pivotally engaging the middle portion of said lever member, said power element moving said thrust element in one direction upon rise in temperature and in the other direction upon fall in temperature; and said lever member being operable upon movement by said thrust element in said one direction to move said other valve member to closed position and thereafter to pivot on the thrust rod therefor to move said one valve member toward open position, and upon mvement in said other direction to permit said one valve member to move to closed position and thereafter to pivot about the thrust rod therefor to permit said other valve member to move toward open position.

7. A valve as defined in claim 6 in which said lever member comprises two levers having a single pivotal connection to each other and to said thrust element, one lever having one end engaging one of said thrust rods, the other lever having its other end engaging the other of said thrust rods, and a thermostatic power element carried by one of said levers and cooperable with the other lever to move the same to adjust the operating relation with said thrust rods to compensate for the effect of temperature of fluid in said casing on said first-named power element.

8. A valve as defined in claim 7 in which said casing has a chamber communicable with said inlet in which said first named power element is positioned and a by-pass outlet from said chamber to provide a continuous flow of fluid to produce a more rapid power element response.

9. In a control valve, a casing having a fluid inlet and a fluid outlet, a pair of passageways in said casing interconnecting said inlet and outlet, valve seats in the inlet and outlet ends of said passageways, a valve member positioned for movement between the valve seats at said passageway inlet ends to direct flow through one or the other of said passageways, a thermostatic power element positioned for response to temperature of a fluid passing through said valve and operable to move said valve member to direct a cooling fluid through one of said passageways and a heating fluid through the other passageway, a pair of valve members cooperable with the valve seats at the outlet ends of said passageways, a first spring cooperable with one of said valves and urging the same toward closed position, a second spring cooperable with the other of said valves and urging the same toward open position, said first spring being substantially stronger than said second spring, thermostatic means including a pivotal thrust transmitting means operatively engageable with said last named valve members and operable upon movement in one direction to close said other valve member first and then open said one valve member and upon movement in the other direction to close said one valve member first and then open said other valve member, said thermostatic means including remote responsive means operable to move said thrust transmitting means in said one direction or the other upon increase or decrease of the temperature of response, and thermostatic means associated with said thrust transmitting means to vary the operative relation of said first named thermostatic means and said last named valve members to compensate for the effect of the different spring forces acting on said last named valve members on said first named thermostatic means.

10. A valve as defined in claim 9 wherein said thrust transmitting means comprises a pair of thrust rods reciprocally guided in said casing and engaging said last-named valve members and a lever member pivotally engaging said thrust rods at its ends; said first named thermostatic means comprising a power element operatively engaging the middle portion of said lever member for moving the same; and said lever member being operable upon movement in one direction to move said other valve member to closed position and thereafter to pivot on the thrust rod therefor to move said one valve member toward open position, and upon mvement in the other direction to permit said one valve member to move to closed position and thereafter to pivot about the thrust rod therefor to permit said other valve member to move toward open position.

11. A valve as defined in claim 10 in which said lever member comprises two levers having a single pivotal connection to each other and to said power element, one lever having one end engaging one of said thrust rods, the other lever having its other end engaging the other of said thrust rods, and a thermostatic power element carried by one of said levers and cooperable with the other lever to move the same to adjust the operating relation with said thrust rods to compensate for the effect of temperature of fluid in said casing and the effect of the different forces exerted by said springs on said first-named power element.

References Cited in the file of this patent
UNITED STATES PATENTS

| | | |
|---|---|---|
| 2,341,785 | Johnson | Feb. 15, 1944 |
| 2,353,889 | Giesler | July 18, 1944 |
| 2,527,622 | Dibert | Oct. 31, 1950 |
| 2,534,251 | Dillman | Dec. 19, 1950 |
| 2,602,593 | Raney | July 8, 1952 |
| 2,656,982 | Drapeau | Oct. 27, 1953 |